United States Patent
Jing et al.

(10) Patent No.: US 9,690,124 B2
(45) Date of Patent: Jun. 27, 2017

(54) VACUUM CELL ALIGNING DEVICE AND METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yangkun Jing, Beijing (CN); Weimin Wu, Beijing (CN); Liang Hong, Beijing (CN); Gui Li, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 75 days.

(21) Appl. No.: 14/895,431

(22) PCT Filed: Apr. 22, 2015

(86) PCT No.: PCT/CN2015/077222
§ 371 (c)(1),
(2) Date: Dec. 2, 2015

(87) PCT Pub. No.: WO2016/101458
PCT Pub. Date: Jun. 30, 2016

(65) Prior Publication Data
US 2016/0363789 A1 Dec. 15, 2016

(30) Foreign Application Priority Data

Dec. 22, 2014 (CN) .......................... 2014 1 0810290

(51) Int. Cl.
*G02F 1/13* (2006.01)
*B32B 37/00* (2006.01)
(Continued)

(52) U.S. Cl.
CPC ............ *G02F 1/1303* (2013.01); *B30B 15/06* (2013.01); *B32B 37/0046* (2013.01);
(Continued)

(58) Field of Classification Search
CPC ........... B32B 38/1825–38/1858; G02F 1/1303
See application file for complete search history.

(56) References Cited

U.S. PATENT DOCUMENTS

| | | | |
|---|---|---|---|
| 6,459,462 B1* | 10/2002 | Seraphim ............ | G02F 1/13336 156/298 |
| 2011/0120619 A1* | 5/2011 | Harada .................. | G02F 1/1303 156/64 |
| 2016/0170245 A1* | 6/2016 | Zhang ................... | G02F 1/1303 445/25 |

* cited by examiner

*Primary Examiner* — Mariceli Santiago
(74) *Attorney, Agent, or Firm* — Brooks Kushman P.C.

(57) ABSTRACT

The present disclosure provides a vacuum cell aligning device and a vacuum cell aligning method. The vacuum cell aligning device includes an upper machining platform, a lower machining platform, a plurality of first cell-pressing unit arranged in parallel in the upper machining platform, a plurality of second cell-pressing unit arranged in parallel in the lower machining platform, and an adjustment mechanism. Each first cell-pressing unit includes a first end-surface towards the lower machining platform and corresponds to a sub-region of the upper substrate. Each second cell-pressing unit includes a second end-surface towards the upper machining platform and corresponds to a sub-region of the lower substrate. The adjustment mechanism is configured to adjust the first cell-pressing units to make a shape defined by the first end-surfaces match the upper substrate, and configured to adjust the second cell-pressing units to make a shape defined by the second end-surfaces match the lower substrate.

20 Claims, 6 Drawing Sheets

(51) Int. Cl.
  *B32B 38/18* (2006.01)
  *B30B 15/06* (2006.01)
  *G02F 1/1333* (2006.01)
  *B32B 37/10* (2006.01)

(52) U.S. Cl.
  CPC ...... *B32B 38/1841* (2013.01); *B32B 38/1866* (2013.01); *B32B 37/10* (2013.01); *B32B 38/1858* (2013.01); *B32B 2457/20* (2013.01); *G02F 2001/133354* (2013.01)

VACUUM CELL ALIGNING DEVICE AND METHOD

CROSS-REFERENCE TO RELATED APPLICATION

This application is the U.S. national phase of PCT Application No. PCT/CN2015/077222 filed on Apr. 22, 2015, which claims a priority of the Chinese Patent Application No. 201410810290.6 filed on Dec. 22, 2014, the disclosures of which are incorporated in their entirety by reference herein.

TECHNICAL FIELD

The present disclosure relates to the field of display manufacture, and in particular to a vacuum cell aligning device and a vacuum cell aligning method.

BACKGROUND

In a process of manufacturing a thin film transistor-liquid crystal display (TFT-LCD), a vacuum cell aligning is a core process of a cell-forming procedure. The cell-forming means that an array substrate and a color filter (CF) substrate of a TFT-LCD are formed by a suction of an upper lapping plate and a lower lapping plate respectively in a near-vacuum environment, and the upper and the lower lapping plates moves towards to each other to bond the array substrate and the color filter substrate. In addition, in a process of manufacturing the other displayers, e.g., a process of manufacturing an electronic paper, the upper and the lower substrate may also need to be oppositely arranged to form a cell.

With a development of a display technology, a curved display panel emerges, such as television with a curved surface and cell phone with a curved surface. There is an increasing requirement of a vacuum cell aligning device in a process of manufacturing such curved display panel, i.e., not only a curvature of the curved surface needs to be guaranteed, but also a suction of the surface needs to be controlled effectively.

In a device of the related art applied to the vacuum cell aligning device for the curved panel, the upper and the lower lapping plates are generally manufactured to have a fixed curvature, so as to adsorb a substrate with a curved surface matching with the fixed curvature and oppositely arrange the upper and the lower lapping plates to form a cell. However, in the vacuum cell aligning device of such structure, one set of upper and lower lapping plates may only be applied to a curved substrate of one shape. For the curved substrates of different shapes, the upper and the lower lapping plates need to be redesigned and remanufactured, which may come into use after a plurality of times of debugging, thereby causing a significant waste of human resources, financial resources and time.

SUMMARY

It is to provide a vacuum cell aligning device and a vacuum cell aligning method, whereby a cell alignment may be applied to the display panels of a plurality of curvatures without replacing the upper and the lower lapping plates.

A vacuum cell aligning device is provide by the present disclosure, configured to oppositely arrange an upper substrate and a lower substrate of a display panel to form a cell, including an upper machining platform and a lower machining platform, where the vacuum cell aligning device further includes:

a plurality of first cell-pressing units arranged in parallel in the upper machining platform, wherein each of the first cell-pressing units includes a first end-surface towards the lower machining platform and corresponds to a sub-region of the upper substrate;

a plurality of second cell-pressing units arranged in parallel in the lower machining platform, wherein each of the second cell-pressing units includes a second end-surface towards the upper machining platform and corresponds to a sub-region of the lower substrate; and an adjustment mechanism, configured to adjust the first cell-pressing units to make all the first end-surfaces together define a shape match with the upper substrate, and configured to adjust the second cell-pressing units to make all the second end-surfaces together define a shape matching with the lower substrate.

Optionally, each of the first cell-pressing unit and the second cell-pressing unit includes:

a support body, fixed to the upper machining platform or the lower machining platform;

a support pillar, connected with the support body; wherein an end-surface of the support pillar of the first cell-pressing unit defines the first end-surface, and an end-surface of the support pillar of the second cell-pressing unit defines the second end-surface;

a first transmission mechanism, jointing the support pillar and the support body;

a second transmission mechanism, jointing the support pillar and the support body;

wherein the adjustment mechanism includes a first adjustment mechanism connected with the first transmission mechanism and configured to control movement of the first transmission mechanism, so as to translate the support pillar up and down relative to the support body;

wherein the adjustment mechanism further includes a second adjustment mechanism connected with the second transmission mechanism and configured to control movement of the second transmission mechanism, so as to rotate the support pillar relative to the support body.

Optionally, the adjustment mechanism includes a first motor and a second motor; wherein the first motor is connected with the first transmission mechanism, and the second motor is connected with the second transmission mechanism.

Optionally, the first transmission mechanism includes a screw and a thread which are engaged with each other; wherein the screw is connected with one of the support body and the support pillar, the thread is arranged at the other of the support body and the support pillar; and the adjustment mechanism is connected with the screw.

Optionally, the second transmission mechanism includes:

a first transmission shaft rotatably connected with the support body; wherein one end of the first transmission shaft is fixed to the support pillar, and the other end of the first transmission shaft is provided with a first bevel gear;

a second transmission shaft, arranged vertically to the first transmission shaft; wherein one end of the second transmission shaft is provided with a second bevel gear meshing with the first bevel gear, and the other end of the second transmission shaft is provided with a worm;

a worm wheel engaged with the worm; wherein the worm wheel is connected with the adjustment mechanism and is driven to rotate by the adjustment mechanism, the second transmission shaft is driven to rotate via engagement between the worm and the worm wheel, the first transmission shaft is driven to rotate via engagement between the first bevel gear and second bevel gear so as to drive the support pillar to rotate around the support body.

Optionally, there are more second cell-pressing units than the first cell-pressing units.

Optionally, the device hereinabove further includes: a drive mechanism, configured to translate the upper machining platform up and down relative to the lower machining platform.

Optionally, the support pillar is provided with a vacuum line along an axis of the support pillar; wherein the vacuum cell aligning device further includes a vacuumizing mechanism connected with the vacuum line.

Optionally, the device hereinabove further includes a first cell-pressing plate arranged on the first end-surfaces of the first cell-pressing units; wherein the first cell-pressing plate is connected with each of the first end-surfaces of the first cell-pressing unit via adsorption; wherein the vacuum cell aligning device further includes a second cell-pressing plate arranged on the second end-surfaces of the second cell-pressing unit, and the second cell-pressing plate is connected with each of the second end-surfaces of the second cell-pressing unit via adsorption.

Optionally, in the device hereinabove, each first cell-pressing unit includes a first cell-pressing plate, and a surface of the first cell-pressing plate opposite to the lower machining platform defines the first end-surface; wherein each second cell-pressing unit includes a second cell-pressing plate, and a surface of the second cell-pressing plate opposite to the upper machining platform defines the second end-surface.

Optionally, in the device hereinabove, a dynamic-sensitive adjustment mechanism is arranged on each first end-surface; wherein the dynamic-sensitive adjustment mechanism is configured to adjust deformation of the first end-surface according to a pressure applied to the sub-region of the upper substrate corresponding to the first end-surface when the upper substrate is adsorbed onto the first end-surface; the dynamic-sensitive adjustment mechanism is further configured to adjust the deformation of the first end-surface according to vacuum suction applied to the sub-region of the upper substrate corresponded to the first end-surface in a process of cell alignment.

Optionally, the device hereinabove further includes a control circuit; wherein the dynamic-sensitive adjustment mechanism includes a flatness-adjustment layer, a piezoelectric-sensitive layer and a surface-adsorption layer in turn from top down;

wherein the piezoelectric-sensitive layer is configured to generate, according to a pressure applied to the sub-region of the upper substrate corresponded to the first end-surface, a pressure-induced current corresponding to a value of the pressure when oppositely arranging the upper and the lower substrates to form a cell, and transmit the pressure-induced current to the control circuit;

wherein the control circuit applies an electric field corresponding to the pressure-induced current to the flatness-adjustment layer, to make the flatness-adjustment layer to deform corresponding to the corresponding sub-region of the upper substrate; and wherein the piezoelectric-sensitive layer generates, according to vacuum suction applied to the sub-region of the upper substrate corresponded to the first end-surface, a suction-induced current corresponding to a value of the vacuum suction, and transmit the suction-induced current to the control circuit;

wherein the control circuit controls a descending speed of the upper machining platform and a voltage applied to the surface-adsorption layer according to the suction-induced current, to make the surface-adsorption layer to deform corresponding to a value of the voltage.

Optionally, in the device hereinabove, the flatness-adjustment layer is made of a piezoceramics; the surface-adsorption layer is made of a force-sensitive electrically-conductive rubber; wherein the force-sensitive electrically-conductive rubber is a flexible electrically-conductive composite material and has an electrical resistivity which is decreased with an increase of a pressure applied thereto.

Optionally, in the device hereinabove, the surface-adsorption layer deforms when being electrified, to form a plurality of suction chucks for adsorbing the upper substrate.

Optionally, in the device hereinabove, a vacuum pipe is arranged at a position of the surface-adsorption layer corresponding to the suction chuck, to vacuumize a confined space formed by the suction chunks and the upper substrate, so as to increase a suction between the surface-adsorption layer and the upper substrate.

Optionally, in the device hereinabove, the piezoelectric-sensitive layer includes a first base substrate, a first sub-electrode arranged on the first base substrate, an intermediate medium layer arranged above the first sub-electrode, a second sub-electrode arranged above the intermediate medium layer, and a second base substrate arranged above the second sub-electrode; wherein a capacitor is formed between the first and the second sub-electrodes; when oppositely arranging the upper and the lower substrates to form a cell, the flatness-adjustment layer is pressed to generate charges such that an electric quantity of the capacitor is changed, thereby the pressure-induced current corresponding to the pressure is generated; when the suction applied to the upper substrate is changed, the pressure applied to the surface-adsorption layer is changed, such that the electrical resistivity of the surface-adsorption layer is changed, and then the suction-induced current corresponding to the suction is generated in the capacitor due to the change of the electrical resistivity.

Optionally, in the device hereinabove, the first cell-pressing units are arranged as an array; wherein the first sub-electrodes of the first cell-pressing units are all arranged in a first direction, and the plurality of the first sub-electrodes forms a first electrode layer on the first base substrate; the second sub-electrodes of the first cell-pressing units are all arranged in a second direction, and the plurality of the second sub-electrodes forms a second electrode layer below the second base substrate.

Optionally, in the device hereinabove, the dynamic-sensitive adjustment mechanism further includes a piezoelectric-sensing layer between the piezoelectric-sensitive layer and the surface-adsorption layer; the piezoelectric-sensing layer is configured to transmit the pressure-induced current and the suction-induced current to the control circuit.

A cell aligning method applying the vacuum cell aligning device hereinabove is further provided, including:

adjusting the first cell-pressing units, to make a composite surface formed by the first end-surfaces of all the first cell-pressing units match with a shape of the upper substrate;

adjusting the second cell-pressing units, to make a composite surface formed by the second end-surfaces of all the second cell-pressing units match with a shape of the lower substrate;

loading the upper and the lower substrates into the vacuum cell aligning device, respectively, with the upper substrate adsorbed onto the first end-surfaces of the first cell-pressing units and the lower substrate adsorbed onto the second end-surfaces of the second cell-pressing units; and driving the upper machining platform to move down, to oppositely arrange the upper and the lower substrates to form a cell.

Optionally, the step of adjusting the first cell-pressing units to make the composite surface formed by the first end-surfaces of all the first cell-pressing units match with the shape of the upper substrate includes:

translating the first cell-pressing units up or down and rotating the first cell-pressing units;

wherein the step of adjusting the second cell-pressing units, to make the composite surface formed by the second end-surfaces of all the second cell-pressing units match with the shape of the lower substrate includes:

translating the second cell-pressing units up or down and rotating the second cell-pressing units.

Optionally, the step of driving the upper machining platform to move down to oppositely arrange the upper and the lower substrates to form a cell includes: adjusting, by a dynamic-sensitive adjustment mechanism arranged on the first end-surface, deformation of the first end-surface according to a pressure applied to a sub-region of the upper substrate corresponded to the first end-surface and a vacuum-suction applied to the sub-region of the upper substrate corresponded to the first end-surface.

The technical scheme of the present disclosure has at least one of the following advantages: when adjusting a height of each cell-pressing unit by the adjustment mechanism, the lower surfaces (i.e., the first end-surfaces) of all the first cell-pressing units may define a curved surface by adjusting a height of each cell-pressing unit by the adjustment mechanism, and the defined curved surface may match the upper substrate. The upper surfaces (i.e., the second end-surfaces) of all the second cell-pressing units may define a curved surface, and the defined curved surface may match the lower substrate. Therefore, when oppositely arranging the upper and the lower substrates of different curvatures to form a cell, it is only needed to adjust a position of each cell-pressing unit without replacing the whole upper and lower lapping plates and that is simple and convenient. Therefore, the vacuum cell aligning device may oppositely arrange the substrates of different curvatures to form a cell. In addition, a shape of the end-surface of the cell-pressing unit matches a shape of the substrates and is attached to the substrates, thereby guaranteeing quality and accuracy of the cell alignment.

DETAILED DESCRIPTION

To make an objective, a technical scheme and advantages of the present disclosure more clear, the present disclosure may be described in details in conjunction with drawings and embodiments.

A vacuum cell aligning device provided by an embodiment of the present disclosure is configured to oppositely arrange an upper substrate and a lower substrate of a display panel to form a cell, including an upper machining platform and a lower machining platform, where the vacuum cell aligning device further includes:

a plurality of first cell-pressing unit arranged in parallel in the upper machining platform, including first end-surfaces towards to the lower machining platform, where each first cell-pressing unit corresponds to a sub-region of the upper substrate;

a plurality of second cell-pressing unit arranged in parallel in the lower machining platform, including second end-surfaces towards to the upper machining platform, where each second cell-pressing unit corresponds to a sub-region of the lower substrate;

an adjustment mechanism, configured to adjust the first cell-pressing unit to make a shape defined by the first end-surfaces match the upper substrate, and configured to adjust the second cell-pressing unit to make a shape formed by the second end-surfaces matched with the lower substrate.

In the vacuum cell aligning device of the structure hereinabove, the upper machining platform includes a plurality of independent first cell-pressing units, and the lower machining platform includes a plurality of independent second cell-pressing units. When adjusting a height of each cell-pressing unit by the adjustment mechanism, the lower surfaces (i.e., the first end-surfaces) of all the first cell-pressing units may from a curved surface by adjusting a height of each cell-pressing unit by the adjustment mechanism, and the formed curved surface may match with the upper substrate. The upper surfaces (i.e., the second end-surfaces) of all the second cell-pressing units may from a curved surface, and the formed curved surface may match with the lower substrate. Therefore, when oppositely arranging the upper and the lower substrates of different curvatures to form a cell, it is only needed to adjust a position of each cell-pressing unit without replacing the whole upper and lower lapping plates and that is simple and convenient. Therefore, the vacuum cell aligning device may oppositely arrange the substrates of different curvatures to form a cell. In addition, a shape of the end-surface of the cell-pressing unit matches with a shape of the substrates and inosculates with the substrates, thereby guaranteeing a quality and an accuracy of the cell alignment.

Figure 1:
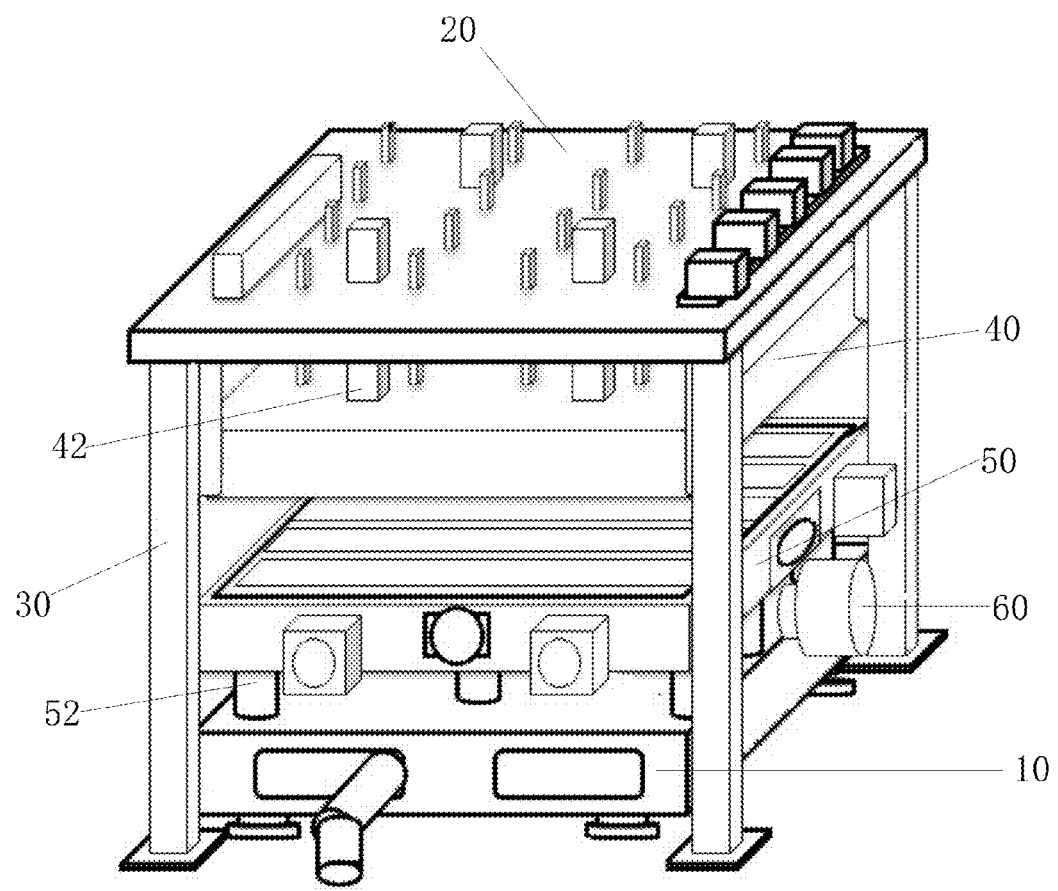
FIG. 1 is a schematic view showing an exterior structure of a vacuum cell aligning device provided by an embodiment of the present disclosure.
Figure 2:
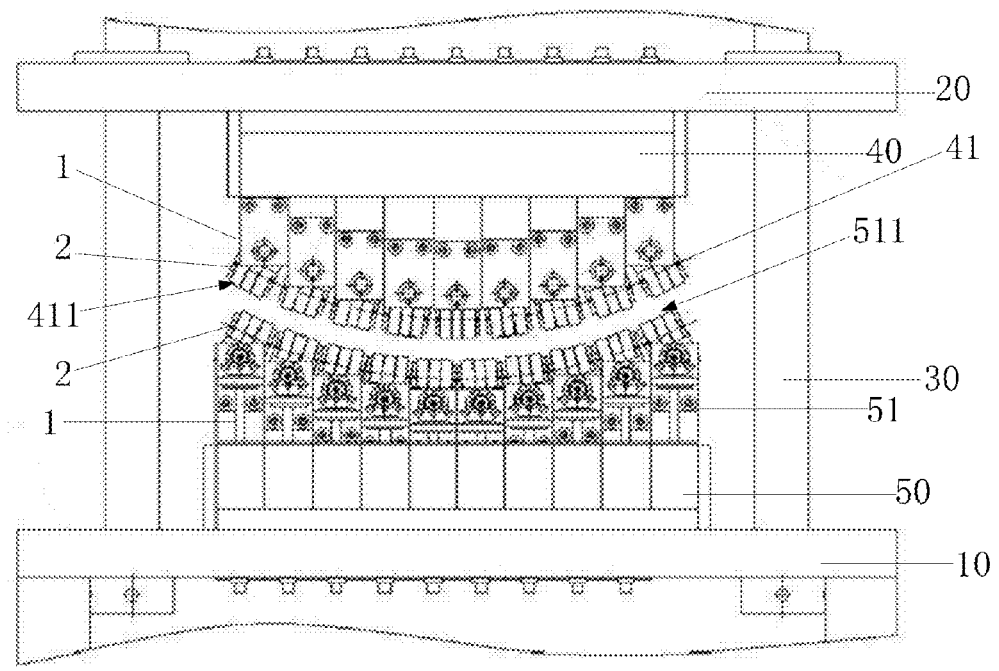
FIG. 2 is a schematic view showing a section structure of a vacuum cell aligning device provided by an embodiment of the present disclosure.

FIG. 1 is a schematic view showing an exterior structure of a vacuum cell aligning device provided by an embodiment of the present disclosure. FIG. 2 is a schematic view showing a section structure of a vacuum cell aligning device provided by an embodiment of the present disclosure. As shown in FIG. 1 and FIG. 2, the vacuum cell aligning device includes a pedestal 10, a top plate 20 and four support pillars 30 arranged between the pedestal 10 and the top plate 20. In addition, an upper machining platform 40 and a lower machining platform 50 which are parallel with and opposite to each other are arranged between the pedestal 10 and the top plate 20.

Figure 3:
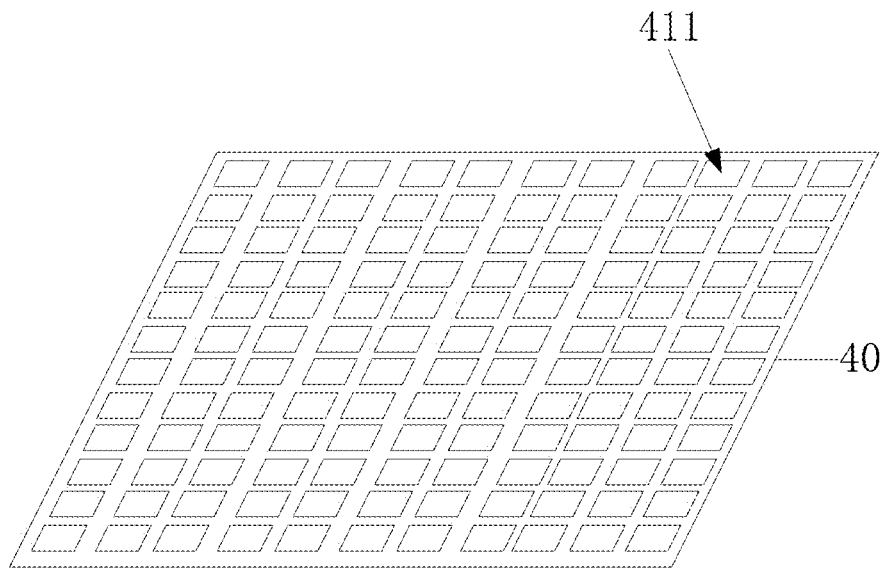
FIG. 3 is a schematic view showing a structure of first end-surfaces of an upper machining platform.

In the embodiment of the present disclosure, a plurality of first cell-pressing units 41 is arranged in parallel in the upper machining platform 40, each of the first cell-pressing units 41 includes a first end-surface 411 towards to the lower machining platform 50, where each of the first cell-pressing units 41 corresponds to a sub-region of the upper substrate. A plurality of second cell-pressing units 51 is arranged in parallel in the lower machining platform 50, each of the second cell-pressing units 51 includes a second end-surface 511 towards to the upper machining platform 40, where each of the second cell-pressing units 51 corresponds to a sub-region of the lower substrate. FIG. 3 is a schematic view showing a structure of the first end-surfaces 411 of an upper machining platform 40. All the first cell-pressing units 41 are arranged as an array on the first end-surfaces 411, and a size and a shape of a surface formed by all the first end-surfaces 411 corresponds to that of the upper substrate. Similarly, a shape formed by the second end-surface 511 of the lower machining platform 50 is the same as the structure shown in FIG. 3, all the second cell-pressing units 51 are arranged as an array, and a size and a shape of a surface formed by all the second end-surfaces 511 corresponds to that of the lower substrate.

As shown in FIG. 2, when adjusting the first end-surfaces 411 of all the first cell-pressing units 41 to move to different heights and inclination angles relative to the upper machining platform 40, all the first end-surfaces 411 are connected with each other to form a curved surface. Similarly, when adjusting the second end-surfaces 511 of all the second cell-pressing units 51 to move to different heights and inclination angles relative to the lower machining platform 50, all the second end-surfaces 511 are jointed with each other to form a curved surface. Based on a same principle, when the shapes of the lower and the upper substrates are determined, the heights and/or inclination angles of the first cell-pressing units 41 and the second cell-pressing units 51 are adjusted before the cell alignment.

In addition, there are more second cell-pressing units 51 than the first cell-pressing units 41, to adapt to that a curvature of the lower substrate is generally bigger than that of the upper substrate. For example, a quantity of the second cell-pressing units 51 may twice that of the first cell-pressing units 41.

In the embodiment of the present disclosure, a vacuum line is arranged in the first cell-pressing units 41 and the second cell-pressing units 51 respectively to joint the first end-surfaces 411 and joint the second end-surfaces 511, and the vacuum cell aligning device further includes an vacuumizing mechanism connected with the vacuum lines in each of the first cell-pressing units 41 and each of the second cell-pressing units 51. The vacuumizing mechanism is configured to vacuumize the vacuum lines of the first cell-pressing units 41 and the second cell-pressing units 51 respectively when adsorbing the lower substrate onto the upper substrate, so that the upper substrate is adsorbed onto the first end-surfaces 411 and the lower substrate is adsorbed onto the second end-surfaces 511. In the embodiment of the present disclosure, the vacuumizing mechanism includes at least one vacuum pump 60 arranged below the lower machining platform 50, as shown in FIG. 1.

Furthermore, in the embodiment of the present disclosure, the vacuum cell aligning device further includes a drive mechanism configured to translate the upper machining platform and the lower machining platform relative to each other. To be specific, as shown in FIG. 1, the drive mechanism includes an upper air cylinder 42 connected with the upper machining platform 40 and a lower air cylinder 52 connected with the lower machining platform 50. The upper air cylinder 42 and the lower air cylinder 52 control the upper machining platform 40 and the lower machining platform 50 respectively to move up and down. For example, when the upper machining platform 40 and the lower machining platform 50 are adsorbed onto the upper and the lower substrates respectively, the upper air cylinder 42 is pressurized to make the upper machining platform 40 to feed towards to the lower machining platform 50, and/or the lower air cylinder 52 is pressurized to make the lower machining platform 50 to feed towards to the upper machining platform 40, such that the upper and the lower substrates are oppositely arranged to form a cell.

In the vacuum cell aligning device in the embodiment hereinabove, a step of cell alignment includes:

adjusting a height and/or an inclination angle of the first cell-pressing unit 41 according to the shape of the upper substrate, to make a shape formed by the first end-surfaces 411 of all the first cell-pressing units 41 matched with the shape of the upper substrate;

adjusting a height and/or an inclination angle of the second cell-pressing unit 51 according to the shape of the lower substrate, to make a shape formed by the second end-surfaces 511 of all the second cell-pressing units 51 matched with the shape of the lower substrate;

loading the upper and the lower substrates into the vacuum cell aligning device respectively, starting the vacuumizing mechanism, to make the upper substrate adsorbed onto the first end-surface of the first cell-pressing unit 41 and make the lower substrate adsorbed onto the second end-surface of the second cell-pressing unit 51; and starting the upper air cylinder 42 and/or the lower air cylinder 52, feeding the upper machining platform 40 and the lower machining platform 50 opposite to each other, to oppositely arrange the upper and the lower substrates to form a cell.

In the embodiment of the present disclosure, FIG. 2 shows the structures of the first cell-pressing unit 41 and the second cell-pressing unit 51, and the first cell-pressing unit 41 and the second cell-pressing unit 51 include respectively:

a support body 1, fixed to the upper machining platform 40 or the lower machining platform 50;

a support pillar 2, jointed with the support body 1, where an end-surface of the support pillar 2 of the first cell-pressing unit 41 forms the first end-surface 411, and an end-surface of the support pillar 2 of the second cell-pressing unit 51 forms the second end-surface 511;

a first transmission mechanism, jointing the support pillar 1 and the support body 2;

a second transmission mechanism, jointing the support pillar 1 and the support body 2;

where the adjustment mechanism includes a first adjustment mechanism jointed with the first transmission mechanism, where the first adjustment mechanism is configured to control movement of the first transmission mechanism, so as to translate the support pillar 2 up and down relative to the support body 1;

where the adjustment mechanism further includes a second adjustment mechanism jointed with the second transmission mechanism, where the second adjustment mechanism is configured to control movement of the second transmission mechanism, so as to rotate the support pillar 1 relative to the support body 2

In the embodiment of the present disclosure, the support pillar 2 is controlled to translate up and down by actions of the first transmission mechanisms of the first cell-pressing unit 41 and the second cell-pressing unit 51, to move the first end-surface 411 up and down relative to the upper machining platform 40 and move the second end-surface 511 up and down relative to the lower machining platform 50. The support pillar 2 is controlled to rotate by actions of the second transmission mechanisms of the first cell-pressing unit 41 and the second cell-pressing unit 51, to make an inclination angel of the first end-surface 411 relative to the upper machining platform 40 changed and make an inclination angel of the second end-surface 511 relative to the upper machining platform 50 changed. In this way, each of the first cell-pressing unit 41 and the second cell-pressing unit 51 is adjusted via a combination action of the first and the second transmission mechanisms, to make first cell-pressing unit 41 and the second cell-pressing unit 51 matched with a curved shape of the upper and the lower substrate respectively.

In the embodiment of the present disclosure, the first transmission mechanism may be implemented by a screw and thread pairs which are matched with each other, where the screw is connected with the support body or the support pillar, the thread pairs are arranged at the support body if the screw is connected with the support pillar or the thread pairs are arranged at the support pillar if the screw is connected with the support body, and the adjustment mechanism is connected with the screw. A relative movement between the support pillar and the support body is realized via a relative movement between the screw and the thread pairs. Those skilled in the art may understand the way of connecting the first transmission mechanism with the support pillar and the support body respectively in this principle, and the detailed description thereof is omitted herein.

Figure 4:
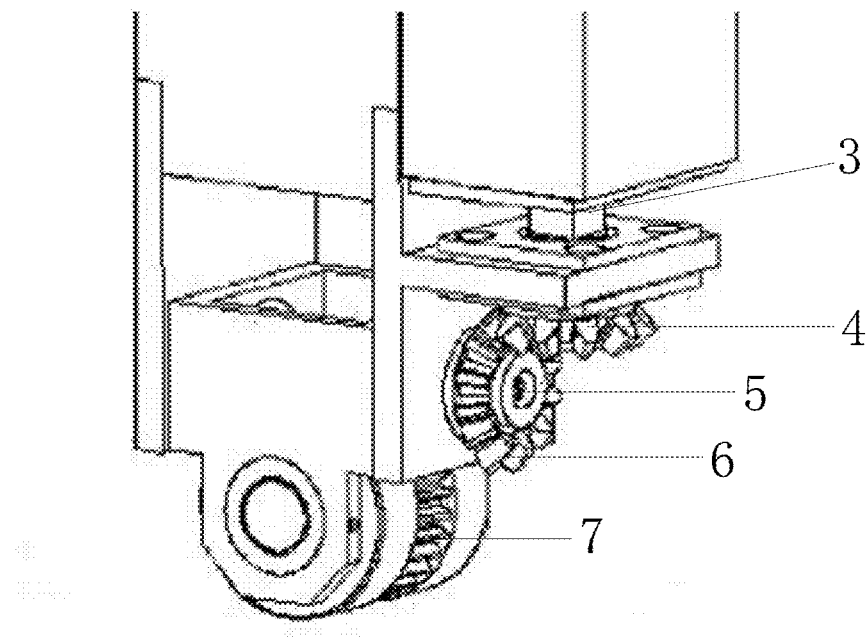
FIG. 4 is a schematic view showing a structure of a second transmission mechanism provided by an embodiment of the present disclosure.

FIG. 4 is a schematic view showing a structure of a second transmission mechanism provided by an embodiment of the present disclosure. As shown in FIG. 4 and FIG. 2, the second transmission mechanism includes:

a first transmission shaft 3, rotatably connected with the support body 1 (as shown in FIG. 2), where one end of the first transmission shaft 3 is fixed to the support pillar 2 (as shown in FIG. 2), and a first bevel gear 4 is arranged at the other end of the first transmission shaft 3;

a second transmission shaft 5, arranged vertically to the first transmission shaft 3, where a second bevel gear 6 meshing the first bevel gear 4 is arranged at one end of the second transmission shaft 5, and a worm (not shown in the figures) is arranged at the other end of the second transmission shaft 5;

a worm wheel 7 matched and connected with the worm, where the worm wheel 7 is connected with the adjustment mechanism, the worm wheel 7 is driven to rotate by the adjustment mechanism, the second transmission shaft 5 is driven to rotate via a matching between the worm and the worm wheel, the first transmission shaft 3 is driven to rotate via a matching between the first bevel gear 4 and second bevel gear 6, and the support pillar 2 is driven to rotate around the support body 1.

As shown in FIG. 2, in the embodiment of the present disclosure, a direction of an axis of the support body 1 around which the support pillar 2 rotates is horizontal rather than vertical, which makes the support pillar 2 rotates within a vertical surface.

Based on the second transmission mechanism hereinabove, those skilled in the art may understand a way of connecting the second transmission mechanism with the support pillar 1 and the support body 2 respectively in this principle, and the detailed description thereof is omitted herein In addition, a vacuum line is arranged in the support pillar along an axis of each of the support pillar 2 in the first cell-pressing unit 41 and the second cell-pressing unit 51 of the structure hereinabove, and the vacuum line is connected with the vacuumizing mechanism, as shown in FIG. 2.

In the vacuum cell aligning device provided by the embodiment of the present disclosure, the adjustment mechanism configured to drive the first and the second transmission mechanisms of the structure hereinabove respectively includes a first motor and a second motor, where the first motor is connected with the first transmission mechanism, and the second motor is connected with the second transmission mechanism. That is, the support pillar 2 is controlled to be translated up and down and to rotate by a respective motor.

Figure 5:
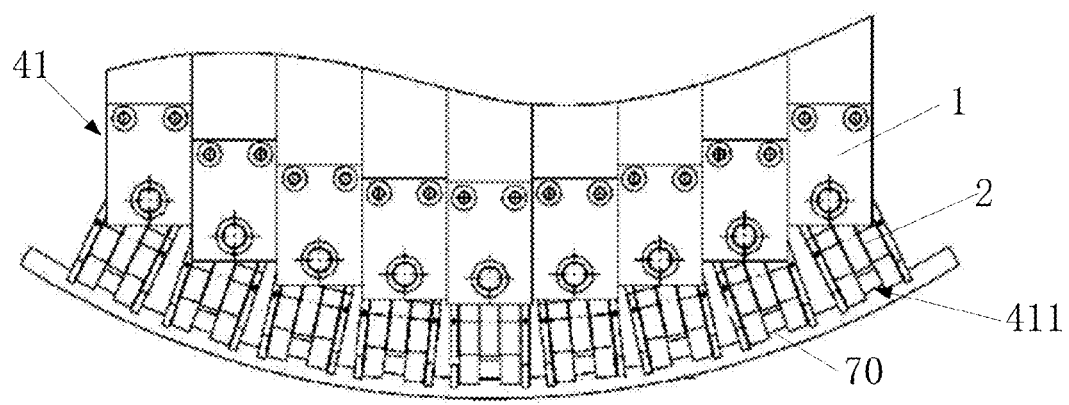
FIG. 5 is a schematic view showing a structure formed by arranging a first cell-pressing plate on the first end-surfaces of the first cell-pressing units.

Optionally, as shown in FIG. 5, the vacuum cell aligning device further includes a first cell-pressing plate 70 arranged on the first end-surface 411 of the first cell-pressing unit 41, where the first cell-pressing plate 70 is adsorbed onto and connected with each of the first end-surfaces 411 of the first cell-pressing unit 41. The vacuum cell aligning device further includes a second cell-pressing plate (not shown in the figures, the structure thereof is the same as the structure of the first cell-pressing plate 70) arranged on the second end-surface 511 of the second cell-pressing unit 51, where the second cell-pressing plate is adsorbed onto and connected with each of the second end-surfaces of the second cell-pressing unit.

To be specific, the first cell-pressing plate 70 and the second cell-pressing plate forms an integral structure respectively on the first end-surface 411 and the second end-surface 511, and the first cell-pressing plate 70 and the second cell-pressing plate include flexible materials. The vacuum lines of the support pillar 2 of the first cell-pressing plate 70 and the second cell-pressing plate respectively are in communication with the first cell-pressing plate 70 and the second cell-pressing plate. The first cell-pressing plate 70 and the second cell-pressing plate are adsorbed by the first cell-pressing unit 41 and the second cell-pressing unit 51 respectively, and first cell-pressing plate 70 and the second cell-pressing plate deform according to a position adjustment of the first cell-pressing unit 41 and the second cell-pressing unit 51 respectively, such that a shape of the first cell-pressing plate 70 matches with the curved surface of the upper substrate and a shape of the second cell-pressing plate matches with the curved surface of the lower substrate. An adsorption surface formed by the first cell-pressing plate 70 and the second cell-pressing plate may be more smooth, thereby guaranteeing that the upper and the lower substrates may be adsorbed onto the first cell-pressing plate 70 and the second cell-pressing plate respectively more accurately.

Excepting the integral structure formed by the first cell-pressing plate 70 and the second cell-pressing plate, structures formed corresponding to the first cell-pressing unit 41 and the second cell-pressing unit 51 may be independent. That is, the first cell-pressing unit 41 and the second cell-pressing unit 51 are connected with a cell-pressing plate respectively, and all the cell-pressing plates are jointed with each other to form structures for adsorbing onto the upper and the lower substrate. To be specific, each of the first cell-pressing unit includes the first cell-pressing plate, and a surface of the first cell-pressing plate opposite to the lower machining platform forms the first end-surface. Each of the second cell-pressing unit includes the second cell-pressing plate, and a surface of the second cell-pressing plate opposite to the upper machining platform forms the second end-surface. In this arrangement, a smooth adsorption surface may be formed to adsorb the upper and the lower substrates to be oppositely arranged to form a cell.

Optionally, the first cell-pressing plate 70 and the second cell-pressing plate include polyurethane materials. By using this material, an indentation and a mura caused in the process of oppositely arranging the curved upper and the lower substrates to form a cell in a vacuum environment.

Based on the vacuum cell aligning device hereinabove, the integral adsorption structure of the vacuum cell aligning device including the curved glass substrates in the related art is separated into a plurality of adsorption structures. By adjusting an up and down translation and a rotating angle of each of the adsorption structures (the first cell-pressing unit and the second cell-pressing unit), a flexible adsorption curved-surface applicable to a three-dimensional curved-surface is formed to oppositely arrange the glass substrates with three-dimensional curved-surfaces to form a cell in a vacuum environment. Compared with the structure in the related art, this structure may adapt to different kinds of glass substrate with a three-dimensional curved-surface, without replacing the upper and the lower lapping plates of a certain structure, thereby reducing a manufacturing cost, improving production efficiency, and realizing a flexible vacuum cell aligning.

Based on the vacuum cell aligning device hereinabove, a dynamic-sensitive adjustment mechanism is arranged on each of the first end-surface 411 of the first cell-pressing unit 41, where the dynamic-sensitive adjustment mechanism is configured to adjust deformation of the first end-surface according to a pressure applied to the sub-region of the upper substrate corresponded to the first end-surface 411 when the upper substrate is adsorbed onto the first end-surface 411. The dynamic-sensitive adjustment mechanism is further configured to adjust the deformation of the first end-surface 411 according to vacuum suction applied to the sub-region of the upper substrate corresponded to the first end-surface 411 in a process of vacuum cell aligning.

In this embodiment, there is a plurality of adsorption structures (i.e., the first cell-pressing unit 41) for adsorbing the upper substrate, and the adsorption structures are at different positions so as to match with a shape of each sub-region of the upper substrate, so a suction of each adsorption structure applied to each sub-regions of the upper substrate may be different when adsorbing the upper substrate onto the first end-surface and oppositely arranging the upper and the lower substrates to form a cell. Therefore, pressure applied to each sub-region of the upper substrate may be different, thus the pressure applied to each sub-region of the upper substrate is not uniform, therefore the upper substrate may be broken in the process of cell machining due to the nonuniform pressure applied to the upper substrate or the bonding between the upper and the lower substrates after the cell machining may be bad, thereby the an accuracy and a quality of the cell alignment may be influenced. In view of this, in the present disclosure, deformation of the first end-surface 411 of the first cell-pressing unit 41 may be adjusted by arranging the dynamic-sensitive adjustment mechanism, to make the pressure applied to each sub-region of the upper substrate uniform.

Figure 6:
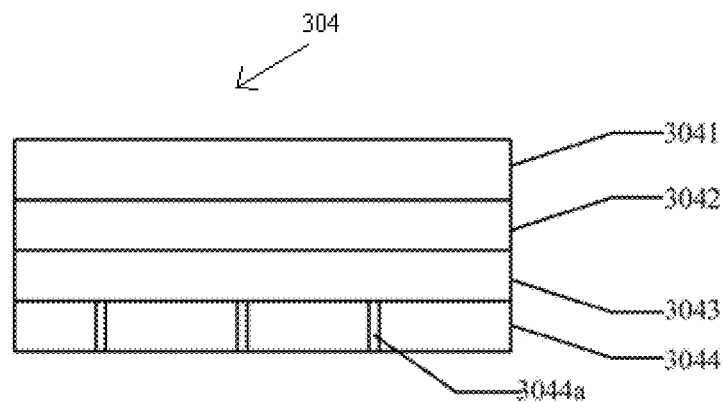
FIG. 6 is a schematic view showing a section structure of a dynamic-sensitive adjustment mechanism.

FIG. 6 is a schematic view showing a dynamic-sensitive adjustment mechanism 304 in the vacuum cell aligning device provided by the embodiment of the present disclosure. The dynamic-sensitive adjustment mechanism 304 is arranged on the first end-surface and includes a flatness-adjustment layer 3041, a piezoelectric-sensitive layer 3042, a piezoelectric-sensing layer 3043 and a surface-adsorption layer 3044 in turn from top down.

In addition, the vacuum cell aligning device further includes a control circuit connected with the dynamic-sensitive adjustment mechanism.

As shown in FIG. 2, the piezoelectric-sensitive layer 3042 is configured to generate, according to the pressure applied to the sub-region of the upper substrate corresponded to the first end-surface 411, a pressure-induced current corresponding to a value of the pressure when oppositely arranging the upper and the lower substrates to form a cell, and transmit the pressure-induced current to the control circuit. The control circuit applies an electric field corresponding to the pressure-induced current to the flatness-adjustment layer 3041, to make the flatness-adjustment layer 3041 to deform corresponding to the corresponding sub-region of the upper substrate.

The piezoelectric-sensitive layer 3042 generates, according to vacuum suction applied to the sub-region of the upper substrate corresponded to the first end-surface 411, a suction-induced current corresponding to a value of the vacuum suction, and transmit the suction-induced current to the control circuit. The control circuit controls a descending speed of the upper machining platform 40 and a voltage applied to the surface-adsorption layer 3044 according to the suction-induced current, to make the surface-adsorption layer 3044 to deform corresponding to a value of the voltage.

To be specific, the flatness-adjustment layer includes a piezoceramics. The piezoceramics may be a multicrystal (e.g., barium titanate series, lead zirconate titanate binary series) formed by fine-grays arranged irregularly obtained by means of prilling, molding and high sintering after mixing raw materials with needful elements. The piezoceramics may deform under an external force or an external electric field, and charges of different polarities may be generated at two sides of the surface corresponding to the deformation. Therefore, in the process of cell alignment, after the upper substrate is adsorbed onto the dynamic-sensitive adjustment mechanism, the upper substrate applies a pressure onto the dynamic-sensitive adjustment mechanism, the flatness-adjustment layer 3041 formed by the piezoceramics in each first end-surface 411 may deform due to the pressure, such that the bonding between the upper substrate and dynamic-sensitive adjustment mechanism may be strengthened, and positive charges and negative charges may be generated at two sides of the deformed position respectively. The electric quantity of the positive charges and the negative charges are the same, and the electric quantity is in direct proportion to the degree of deformation. However, the deform caused by the pressure is not stable, so an electric filed is required to be applied to the deformed flatness-adjustment layer, so as to make the flatness-adjustment layer 3041 to remain the deformation under the electric filed.

Because the flatness-adjustment layer 3041 touches the piezoelectric-sensitive layer directly, a charge variation of a surface of the flatness-adjustment layer may cause a charge variation of a surface of the piezoelectric-sensitive layer 3042, such that a pressure-induced current may be generated in the piezoelectric-sensitive layer 3042 and the pressure-induced current may be transmitted to the control circuit via the piezoelectric-sensing layer 3043. The control circuit applies, according to the received pressure-induced current, an electric field corresponding to the pressure-induced current to the flatness-adjustment layer 3041, to make the flatness-adjustment layer 3041 to deform corresponding to the corresponding sub-region of the upper substrate with an action of the electric field and remain the deformation, thereby enhancing the bonding between the dynamic-sensitive adjustment mechanism and the upper substrate, eliminating the nonuniform pressure caused by the height variation of the surface of the substrate, and compensating the flatness of the upper substrate. A height adjustment within a range of 50 micron may be applied to the flatness-adjustment layer 3041.

Figure 7:
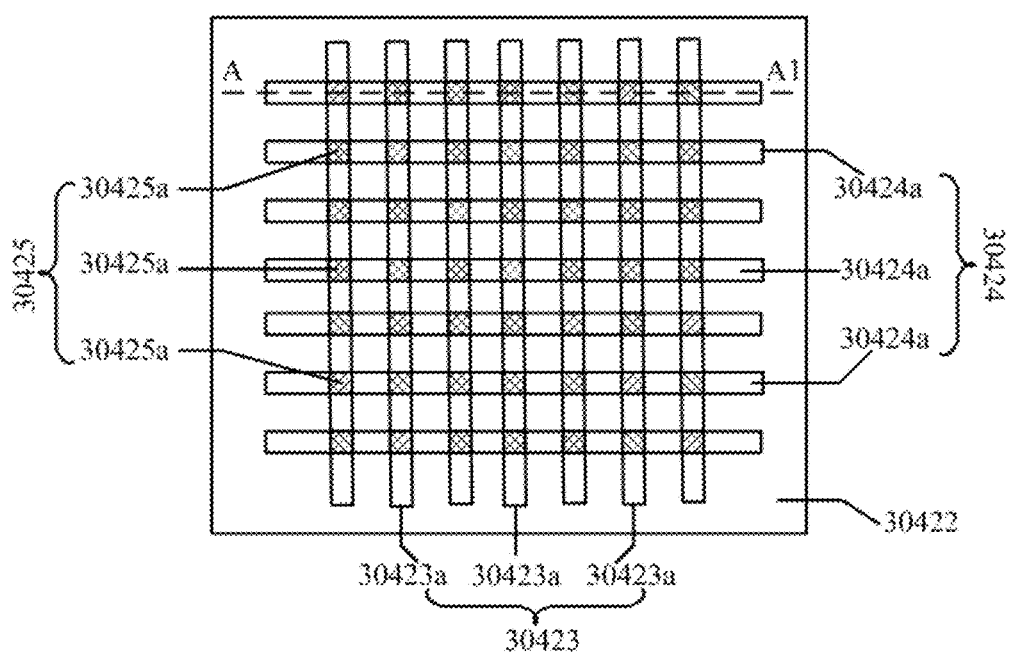
FIG. 7 is a schematic view showing a planar structure of a piezoelectric-sensitive layer.
Figure 8:
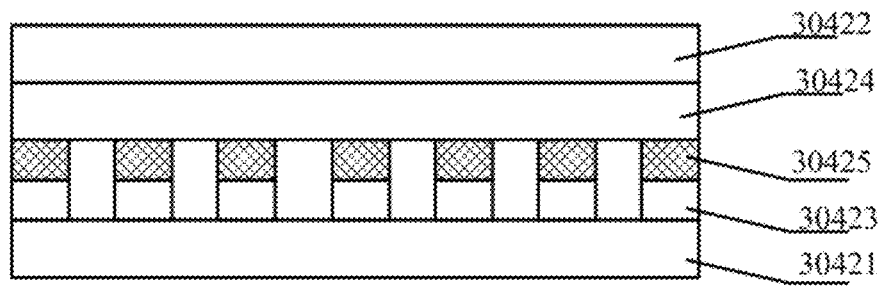
FIG. 8 is a schematic view showing the planar structure of the piezoelectric-sensitive layer shown in FIG. 7 along a direction of A-A1.

The piezoelectric-sensitive layer 3042 is arranged below the flatness-adjustment layer 3041. FIG. 7 is a schematic view showing a planar structure of a piezoelectric-sensitive layer 3042, FIG. 8 is a schematic view showing the planar structure of the piezoelectric-sensitive layer 3042 shown in FIG. 7 along a direction of A-A1. As shown in FIG. 7 and FIG. 8, the piezoelectric-sensitive layer 3042 includes: a first base substrate 30421 and a second base substrate 30422 arranged opposite to each other; a first sub-electrode 30423a arranged on the first base substrate 30421, towards to the second base substrate 30422; a second sub-electrode 30424a arranged on the second base substrate 30422, towards to the first base substrate 30421; and an intermediate medium layer 30425 arranged between the first sub-electrode 30423a and the second sub-electrode 30424a arranged above the intermediate medium layer, and a second base substrate arranged above the second sub-electrode.

A capacitor is formed between the first sub-electrode 30423a and the second sub-electrode 30424a. The flatness-adjustment layer 3041 is subjected to the pressure and then generates charges such that an electric quantity of the capacitor is changed, thereby the pressure-induced current corresponding to the pressure is generated, when oppositely arranging the upper and the lower substrates to form a cell. The pressure applied to the surface-adsorption layer 3044 is changed when the suction applied to the upper substrate is changed, such that the electrical resistivity of the surface-adsorption layer 3044 is changed, and then the suction-induced current corresponding to the suction is generated in the capacitor due to the change of the electrical resistivity.

The first sub-electrodes 30423a on the first end-surfaces 411 are all arranged in a first direction, and the plurality of the first sub-electrodes 30423a forms on the first base substrate 30421 a first electrode layer 30423.

The second sub-electrodes 30424a of the first end-surfaces 411 are all arranged in a second direction, and the plurality of the second sub-electrodes 30424a forms below the second base substrate 30422 a second electrode layer 30424.

The first sub-electrodes 30423a and the second sub-electrodes 30424a include an electrically-conductive metal material such as titanium and aluminum.

The intermediate medium layer 30425 includes a plurality of rectangular pyramid-like intermediate medium layer units 30425a arranged as an array. Each intermediate medium layer unit 30425a is arranged between the first sub-electrodes 30423a and the second sub-electrodes 30424a, such that the piezoelectric-sensitive layer 3042 has a sound static property and dynamic property. Whether the piezoelectric-sensitive layer 3042 is subjected to a momentary touching or a continuous pressure, it may acquire the touching information effectively.

In the dynamic-sensitive adjustment mechanism, when a pressure-induced current or a suction-induced current generated in the dynamic-sensitive adjustment mechanism on one of the first end-surfaces 411 is sensed, a position of the first end-surface 411 may be determined by detecting coordinates of the corresponding first sub-electrode 30423a and second sub-electrode 30424a, which is to the benefit of improving a control accuracy of the control circuit and then improving an accuracy of cell alignment.

The piezoelectric-sensing layer 3043 is arranged below the piezoelectric-sensitive layer 3042, which is configured to transmit the pressure-induced current and the suction-induced current to the control circuit. The piezoelectric-sensing layer 3043 also includes a piezoceramics, which may further improve an adjustment ability of the dynamic-sensitive adjustment mechanism 304 in a vertical direction. In addition, the piezoelectric-sensing layer 3043 may further include other electrically-conductive materials, or the piezoelectric-sensing layer 3043 may further be replaced by electrically-conductive wires.

The surface-adsorption layer 3044 is arranged below the piezoelectric-sensing layer 3043, which transmits to the control circuit the pressure-induced current corresponded to the pressure applied by the upper substrate to the dynamic-sensitive adjustment mechanism 304 and the suction-induced current corresponded to the suction applied to the upper substrate.

The surface-adsorption layer 3044 includes a force-sensitive electrically-conductive rubber. The force-sensitive electrically-conductive rubber is formed by filling different carbonaceous electrically-conductive materials (e.g., carbon black, graphite, carbon fiber) into a silicone rubber or other macromolecular basis materials. In this embodiment, the force-sensitive electrically-conductive rubber includes a carbon black-silicone rubber, where the carbon black-silicone rubber is a silicone rubber filled with carbon black, and a mass fraction of the carbon black is 8%. The force-sensitive electrically-conductive rubber is flexible. With an increase of the pressure, a volume fraction of the rubber decreases and a volume fraction of the electrically-conductive particles increases, and the electrical resistivity of the rubber may decrease with the increase of the applied pressure.

The surface-adsorption layer 3044 deforms when being electrified, to form a plurality of suction chucks adsorbed onto the upper substrate. A vacuum pipe 3044a is arranged in the surface-adsorption layer 3044 to vacuumize a confined space formed by the suction chunks and the upper substrate, so as to increase a suction between the suction chucks and the upper substrate, thus the upper substrate is adsorbed onto the surface of the surface-adsorption layer 3044 only by the suction.

After the upper substrate is adsorbed onto the surface of the surface-adsorption layer 3044 only by the suction, the upper substrate is absorbed by the surface-adsorption layer 3044, and a pressure corresponding to the suction is applied to the surface-adsorption layer 3044. The electrical resistivity of the surface-adsorption layer 3044 of each first end-surface 411 may change when a pressure is applied to the surface-adsorption layer 3044, such that a suction-induced current corresponding to the suction is generated in the piezoelectric-sensitive layer 3042, and then the suction-induced current is transmitted to the control circuit via the piezoelectric-sensitive layer 3042. The control circuit controls a descending speed of the upper machining platform 301 and a voltage applied to the surface-adsorption layer 3044 according to the suction-induced current, to make the surface-adsorption layer 3044 of each first end-surface 411 to deform corresponding to a value of the voltage, thereby the pressure applied to the upper substrate is more uniform, an accuracy and a quality of the cell alignment are improved, the upper substrate is not prone to be broken, and then a safety of production is further improved.

After the upper and lower substrates are oppositely arranged to form a cell, the control circuit applies a reverse voltage to the surface-adsorption layer 3044 of each first end-surface 411, and then the suction chunks on the surface-adsorption layer 3044 disappears immediately and the surface-adsorption layer 3044 returns to be smooth, and the suction applied to the upper substrate decreases. At this point, an inert gas (e.g., nitrogen and argon) is input by the vacuum pipes 3044a in the suction chunks, such that the upper substrate is stripped from the dynamic-sensitive adjustment mechanism 304 completely. When inputting the gas, the gas is diffused onto the surface of the upper substrate uniformly, so the upper and the lower substrates may be bonded more closely. In addition, the gas is input after the upper and the lower substrates are bonded to form the cell, thereby guaranteeing a vacuum environment of the cell of display panel formed by oppositely arranging the upper and the lower substrates, avoiding nitrogen gas bubbles and vacuum bubbles, and improving a uniformity of cell thickness and a quality of the cell alignment. In addition, the upper substrate is stripped from the dynamic-sensitive adjustment mechanism 304, thereby avoiding a black spot or a macula caused by using a thimble in the related art, and improving a quality of the display panel.

In addition, the dynamic-sensitive adjustment mechanism 304 may be powered off rather than applying a reverse voltage thereto to make the suction chunks disappeared itself. However, a disappearing of the suction chunks is slower than that after applying a reverse voltage.

Furthermore, a connection structure is further arranged in the vacuum cell aligning device. The connection structure is arranged between the upper machining platform 40 and the dynamic-sensitive adjustment mechanism 304, which is configured to fix the dynamic-sensitive adjustment mechanism 304 onto a surface of the upper machining platform 40. The connection structure is a stereotyped permanent magnet pedestal or an electromagnet pedestal, and the dynamic-sensitive adjustment mechanism is fixed to the connection structure by means of bonding, screw jointing or clamping. By the electromagnet structure of the upper machining platform, the dynamic-sensitive adjustment mechanism is fixed to the upper machining platform via an attraction between magnets. When needing to replace the dynamic-sensitive adjustment mechanism, it is only required to apply a reverse voltage to the electromagnet structure of the upper machining platform to make the two magnets excluded to each other, and then the dynamic-sensitive adjustment mechanism may be removed.

The control circuit connected with the dynamic-sensitive adjustment mechanism in the embodiment hereinabove may arranged on a top plate 20 of the vacuum cell aligning device shown in FIG. 1, and the control circuit is connected with a drive mechanism controlling the upper machining platform 40 to move. The drive mechanism obtains an inductive signal of the dynamic-sensitive adjustment mechanism and controls the upper machining platform 40 to move in the process of cell alignment according to the inductive signal.

By the vacuum cell aligning device in the embodiment of the present disclosure, the process of the cell alignment of the substrates is controlled by two parts. One part is implemented by a control of a motor which controls the support pillars on the first and the second cell-pressing units to move and rotate to make the first end-surface 411 and the second end-surface of the first cell-pressing unit matched with the curved upper and lower substrates respectively, to guarantee the adsorption end-surface and the lower and upper substrates matched with each other closely. The other part is implemented by an sensing of the dynamic-sensitive adjustment mechanism, deformation of the first end-surface is adjusted to guarantee that the pressure applied to the sub-regions of the upper substrate is uniform, thereby guaranteeing an accuracy and a quality of the cell alignment.

In addition, in the vacuum cell aligning device herein above, a displacement of the upper machining platform is adjusted according to pressure state data obtained by the dynamic-sensitive adjustment mechanism, to adjust a feed rate of the upper machining platform in the process of cell alignment and adjust a pressure applied to the upper substrate by the upper machining platform.

A cell aligning method applying the vacuum cell aligning device hereinabove is provided by an embodiment of the present disclosure. The method includes:

adjusting the first cell-pressing unit, to make a composite surface formed by the first end-surfaces of all the first cell-pressing units matched with a shape of the upper substrate; adjusting the second cell-pressing unit, to make a composite surface formed by the second end-surfaces of all the second cell-pressing units matched with a shape of the lower substrate;

loading the upper and the lower substrates into the vacuum cell aligning device respectively, to make the upper substrate adsorbed onto the first end-surface of the first cell-pressing unit and make the lower substrate adsorbed onto the second end-surface of the second cell-pressing unit; and driving the upper machining platform to move down, to oppositely arrange the upper and the lower substrates to form a cell.

To be specific, a step of adjusting the first cell-pressing unit to make the composite surface formed by the first end-surfaces of all the first cell-pressing units matched with the shape of the upper substrate includes: translating the first cell-pressing unit up or down and rotating the first cell-pressing unit. A step of adjusting the second cell-pressing unit, to make the composite surface formed by the second end-surfaces of all the second cell-pressing units matched with the shape of the lower substrate includes: translating the second cell-pressing unit up or down and rotating the second cell-pressing unit.

In addition, a step of driving the upper machining platform to move down to oppositely arrange the upper and the lower substrates to form a cell includes: adjusting, by the dynamic-sensitive adjustment mechanism arranged on the first end-surface, the deformation of the first end-surface according to the pressure applied to the sub-region of the upper substrate corresponded to the first end-surface and the vacuum suction applied to the sub-region of the upper substrate corresponded to the first end-surface.

By the vacuum cell aligning device and the vacuum cell aligning method, the adsorption end-surface and the lower and upper substrates may be guaranteed to be matched with each other closely, and deformation of the first end-surface is adjusted according to the pressure applied to each sub-region of the upper substrate in the process of cell alignment, to guarantee that the pressure applied to the sub-regions of the upper substrate is uniform, thereby guaranteeing an accuracy and a quality of the cell alignment.

The above descriptions are merely the embodiments of the present disclosure. It should be noted that, improvements and modifications made by those skilled in the art without departing from the principle and spirit of the present disclosure may fall into the scope of the present disclosure.

What is claimed is:

1. A vacuum cell aligning device, configured to oppositely arrange an upper substrate and a lower substrate of a display panel to form a cell, comprising an upper machining platform and a lower machining platform; wherein the vacuum cell aligning device further comprises:
   a plurality of first cell-pressing units arranged in parallel in the upper machining platform, wherein each of the first cell-pressing units comprises a first end-surface towards the lower machining platform and corresponds to a sub-region of the upper substrate;
   a plurality of second cell-pressing units arranged in parallel in the lower machining platform, wherein each of the second cell-pressing units comprises a second end-surface towards the upper machining platform and corresponds to a sub-region of the lower substrate; and
   an adjustment mechanism, configured to adjust the first cell-pressing units to make all the first end-surfaces together define a shape match with the upper substrate, and configured to adjust the second cell-pressing units to make all the second end-surfaces together define a shape matching with the lower substrate.

2. The device according to claim 1, wherein each of the first cell-pressing unit and the second cell-pressing unit comprises:
   a support body, fixed to the upper machining platform or the lower machining platform;
   a support pillar, connected with the support body; wherein an end-surface of the support pillar of the first cell-pressing unit defines the first end-surface, and an end-surface of the support pillar of the second cell-pressing unit defines the second end-surface;
   a first transmission mechanism, jointing the support pillar and the support body;
   a second transmission mechanism, jointing the support pillar and the support body;
   wherein the adjustment mechanism comprises a first adjustment mechanism connected with the first transmission mechanism and configured to control movement of the first transmission mechanism, so as to translate the support pillar up and down relative to the support body;
   wherein the adjustment mechanism further comprises a second adjustment mechanism connected with the second transmission mechanism and configured to control movement of the second transmission mechanism, so as to rotate the support pillar relative to the support body.

3. The device according to claim 2, wherein the adjustment mechanism comprises a first motor and a second motor; wherein the first motor is connected with the first transmission mechanism, and the second motor is connected with the second transmission mechanism.

4. The device according to claim 2, wherein the first transmission mechanism comprises a screw and a thread which are engaged with each other; wherein the screw is connected with one of the support body and the support pillar, the thread is arranged at the other of the support body and the support pillar; and the adjustment mechanism is connected with the screw.

5. The device according to claim 2, wherein the second transmission mechanism comprises:
   a first transmission shaft rotatably connected with the support body; wherein one end of the first transmission shaft is fixed to the support pillar, and the other end of the first transmission shaft is provided with a first bevel gear;
   a second transmission shaft, arranged vertically to the first transmission shaft; wherein one end of the second transmission shaft is provided with a second bevel gear meshing with the first bevel gear, and the other end of the second transmission shaft is provided with a worm;
   a worm wheel engaged with the worm; wherein the worm wheel is connected with the adjustment mechanism and is driven to rotate by the adjustment mechanism, the second transmission shaft is driven to rotate via engagement between the worm and the worm wheel, the first transmission shaft is driven to rotate via engagement between the first bevel gear and second bevel gear so as to drive the support pillar to rotate around the support body.

6. The device according to claim 1, further comprising: a drive mechanism, configured to translate the upper machining platform up and down relative to the lower machining platform.

7. The device according to claim 2, wherein the support pillar is provided with a vacuum line along an axis of the support pillar;
   wherein the vacuum cell aligning device further comprises a vacuumizing mechanism connected with the vacuum line.

8. The device according to claim 1, further comprising a first cell-pressing plate arranged on the first end-surfaces of the first cell-pressing units; wherein the first cell-pressing plate is connected with each of the first end-surfaces of the first cell-pressing unit via adsorption; wherein the vacuum cell aligning device further comprises a second cell-pressing plate arranged on the second end-surfaces of the second cell-pressing unit, and the second cell-pressing plate is connected with each of the second end-surfaces of the second cell-pressing unit via adsorption.

9. The device according to claim 1, wherein each first cell-pressing unit comprises a first cell-pressing plate, and a surface of the first cell-pressing plate opposite to the lower machining platform defines the first end-surface; wherein each second cell-pressing unit comprises a second cell-pressing plate, and a surface of the second cell-pressing plate opposite to the upper machining platform defines the second end-surface.

10. The device according to claim 1, wherein a dynamic-sensitive adjustment mechanism is arranged on each first end-surface; wherein the dynamic-sensitive adjustment mechanism is configured to adjust deformation of the first end-surface according to a pressure applied to the sub-region of the upper substrate corresponding to the first end-surface when the upper substrate is adsorbed onto the first end-surface; the dynamic-sensitive adjustment mechanism is further configured to adjust the deformation of the first end-surface according to vacuum suction applied to the sub-region of the upper substrate corresponded to the first end-surface in a process of cell alignment.

11. The device according to claim 10, further comprising a control circuit; wherein the dynamic-sensitive adjustment mechanism comprises a flatness-adjustment layer, a piezoelectric-sensitive layer and a surface-adsorption layer in turn from top down;
   wherein the piezoelectric-sensitive layer is configured to generate, according to the pressure applied to the sub-region of the upper substrate corresponding to the first end-surface, a pressure-induced current corresponding to a value of the pressure when oppositely arranging the upper and the lower substrates to form a cell, and transmit the pressure-induced current to the control circuit;

wherein the control circuit applies an electric field corresponding to the pressure-induced current to the flatness-adjustment layer, to make the flatness-adjustment layer to deform corresponding to the corresponding sub-region of the upper substrate; and wherein the piezoelectric-sensitive layer generates, according to the vacuum suction applied to the sub-region of the upper substrate corresponding to the first end-surface, a suction-induced current corresponding to a value of the vacuum suction, and transmit the suction-induced current to the control circuit;

wherein the control circuit controls a descending speed of the upper machining platform and a voltage applied to the surface-adsorption layer according to the suction-induced current, to make the surface-adsorption layer to deform corresponding to a value of the voltage.

12. The device according to claim 11, wherein the flatness-adjustment layer is made of piezoceramics;

the surface-adsorption layer is made of a force-sensitive electrically-conductive rubber; wherein the force-sensitive electrically-conductive rubber is a flexible electrically-conductive composite material and has an electrical resistivity which is decreased with an increase of a pressure applied thereto.

13. The device according to claim 11, wherein the surface-adsorption layer deforms when being electrified, to form a plurality of suction chucks for adsorbing the upper substrate.

14. The device according to claim 13, wherein a vacuum pipe is arranged at a position of the surface-adsorption layer corresponding to the suction chuck, to vacuumize a confined space formed by the suction chunks and the upper substrate, so as to increase suction between the surface-adsorption layer and the upper substrate.

15. The device according to claim 14, wherein the piezoelectric-sensitive layer comprises a first base substrate, a first sub-electrode arranged on the first base substrate, an intermediate medium layer arranged above the first sub-electrode, a second sub-electrode arranged above the intermediate medium layer, and a second base substrate arranged above the second sub-electrode;

wherein a capacitor is formed between the first and the second sub-electrodes; when oppositely arranging the upper and the lower substrates to form a cell, the flatness-adjustment layer is pressed to generate charges such that an electric quantity of the capacitor is changed, thereby the pressure-induced current corresponding to the pressure is generated; when the suction applied to the upper substrate is changed, the pressure applied to the surface-adsorption layer is changed, such that the electrical resistivity of the surface-adsorption layer is changed, and then the suction-induced current corresponding to the suction is generated in the capacitor due to the change of the electrical resistivity.

16. The device according to claim 15, wherein the first cell-pressing units are arranged as an array; wherein the first sub-electrodes of the first cell-pressing units are all arranged in a first direction, and the plurality of the first sub-electrodes forms a first electrode layer on the first base substrate;

the second sub-electrodes of the first cell-pressing units are all arranged in a second direction, and the plurality of the second sub-electrodes forms a second electrode layer below the second base substrate.

17. The device according to claim 11, wherein the dynamic-sensitive adjustment mechanism further comprises a piezoelectric-sensing layer between the piezoelectric-sensitive layer and the surface-adsorption layer; the piezoelectric-sensing layer is configured to transmit the pressure-induced current and the suction-induced current to the control circuit.

18. A cell aligning method applying the vacuum cell aligning device according to claim 1, comprising:

adjusting the first cell-pressing units, to make a composite surface formed by the first end-surfaces of all the first cell-pressing units match with a shape of the upper substrate; adjusting the second cell-pressing units, to make a composite surface formed by the second end-surfaces of all the second cell-pressing units match with a shape of the lower substrate;

loading the upper and the lower substrates into the vacuum cell aligning device, respectively, with the upper substrate adsorbed onto the first end-surfaces of the first cell-pressing units and the lower substrate adsorbed onto the second end-surfaces of the second cell-pressing units; and driving the upper machining platform to move down, to oppositely arrange the upper and the lower substrates to form a cell.

19. The method according to claim 18, where the step of adjusting the first cell-pressing units to make the composite surface formed by the first end-surfaces of all the first cell-pressing units match with the shape of the upper substrate comprises:

translating the first cell-pressing units up or down and rotating the first cell-pressing units;

wherein the step of adjusting the second cell-pressing units, to make the composite surface formed by the second end-surfaces of all the second cell-pressing units match with the shape of the lower substrate comprises:

translating the second cell-pressing units up or down and rotating the second cell-pressing units.

20. The method according to claim 18, wherein the step of driving the upper machining platform to move down to oppositely arrange the upper and the lower substrates to form a cell comprises:

adjusting, by a dynamic-sensitive adjustment mechanism arranged on the first end-surface, deformation of the first end-surface according to a pressure applied to a sub-region of the upper substrate corresponding to the first end-surface and a vacuum suction applied to the sub-region of the upper substrate corresponding to the first end-surface.

* * * * *